US012468141B2

(12) United States Patent
Avasarala et al.

(10) Patent No.: US 12,468,141 B2
(45) Date of Patent: Nov. 11, 2025

(54) ULTRASONIC BORESCOPE FOR DRILLED SHAFT INSPECTION

(71) Applicant: Aver Technologies, Inc., Woodbridge, VA (US)

(72) Inventors: Pallavi Avasarala, Woodbridge, VA (US); Pranav Avasarala, Woodbridge, VA (US)

(73) Assignee: Aver Technologies, Inc., Woodbridge, VA (US)

( * ) Notice: Subject to any disclaimer, the term of this patent is extended or adjusted under 35 U.S.C. 154(b) by 495 days.

(21) Appl. No.: 17/888,832

(22) Filed: Aug. 16, 2022

(65) Prior Publication Data

US 2023/0050623 A1 Feb. 16, 2023

Related U.S. Application Data

(60) Provisional application No. 63/233,479, filed on Aug. 16, 2021.

(51) Int. Cl.

| | |
|---|---|
| ***G02B 23/24*** | (2006.01) |
| ***G01N 29/07*** | (2006.01) |
| *G01N 33/24* | (2006.01) |
| *H04N 23/51* | (2023.01) |

(52) U.S. Cl.

CPC ......... *G02B 23/2476* (2013.01); *G01N 29/07* (2013.01); *G01N 33/24* (2013.01); *G01N 2291/02827* (2013.01); *G01N 2291/02854* (2013.01); *H04N 23/51* (2023.01)

(58) Field of Classification Search

CPC .. G01N 3/08; G01N 3/40; G01N 3/42; G01N 29/07; G01N 33/24

See application file for complete search history.

(56) References Cited

U.S. PATENT DOCUMENTS

| | | | |
|---|---|---|---|
| 5,726,349 | A | 3/1998 | Palmertree et al. |
| 7,187,784 | B2 | 3/2007 | Tawfiq et al. |
| 8,169,477 | B2 | 5/2012 | Tawfiq et al. |
| 10,557,340 | B2 | 2/2020 | Avasarala et al. |
| 10,677,039 | B1 | 6/2020 | Avasarala et al. |
| 2006/0158652 | A1 | 7/2006 | Rooney et al. |
| 2019/0120041 | A1 | 4/2019 | Avasarala et al. |

OTHER PUBLICATIONS

Communication Relating to Partial International Search in PCT/US2022/040431, dated Oct. 27, 2022 (16 pages).

*Primary Examiner* — Erika J. Villaluna

(74) *Attorney, Agent, or Firm* — Bookoff McAndrews, PLLC

(57) ABSTRACT

An ultrasonic penetrometer may include an enclosure, an ultrasonic sensor, and a rod. The enclosure may include a channel having a first end and a second end. The ultrasonic sensor may be provided at the first end of the channel and may be configured to generate an ultrasound signal through the second end of the channel. An output from the ultrasound sensor may be used to determine a thickness or stiffness of sediment. The rod may have a proximal end facing the ultrasonic sensor and a distal end opposite the proximal end. The rod may be configured to move relative to the enclosure. The distal end may be configured to contact the sediment. The enclosure may be configured to be fluid-tight relative to an exterior of the enclosure such that the generated ultra-sound signal travels in a single medium.

20 Claims, 14 Drawing Sheets

438 408a 408 408c 414 414 404 413 α 408b 460 406 412 402

ULTRASONIC BORESCOPE FOR DRILLED SHAFT INSPECTION

CROSS-REFERENCE TO RELATED APPLICATIONS

This application claims the benefit of priority under 35 U.S.C. 119 of U.S. Provisional Patent Application No. 63/233,479, filed on Aug. 16, 2021, which is incorporated by reference herein in its entirety

TECHNICAL FIELD

The disclosure relates generally to a borescope system for use in inspecting and profiling drilled shafts, also referred to as bores or boreholes, using multiple cameras and ultrasonic sensors. In particular, the disclosure relates to a portable system for inspecting and profiling relatively large drilled construction shafts that may improve inspection efficiency in terms of maneuverability, information gathering, data recording, data analyzing, and data qualifying.

INTRODUCTION

Drilled construction shafts that are subsequently filled with concrete or similar materials provide support for many large building and infrastructure projects. For this reason, field engineers, and inspectors involved in preparing such shafts are particularly concerned with ensuring that the load transfers in side resistance and in end bearing are consistent with any assumptions made during the design phase.

Normally, project design methods assume that drilled shafts are constructed under competent supervision with ample quality control and the finished foundation will be durable and have structural integrity. However, such assumptions are not always warranted. For example, the foundation boreholes constructed are roughly cylindrical in shape. However, the theoretical volume of bore is not same as the actual volume of the bore due to reasons such as hole size being greater than the bit used to create the hole, caving on the side of the bore, etc. Unless project specifications and procedures are closely followed in the field, for example, the final shaft may have defects that can influence its structural and bearing capacity when filled. Therefore, the inspection and profiling of the drilled shafts and the record keeping associated with the shaft construction are important and require careful attention.

Defects of a finished support structure and the conditions under which such defects occur may involve a number of causes. For example, defects typically result from one or more of the following: 1) over stressing the soil beneath the shaft base due to insufficient bearing (contact) area or because of unconsolidated materials located at the shaft base; 2) excessive mixing from mineral slurry, which can affect the development of concrete strength and/or formation of voids and cavities within the set concrete; and 3) structural discontinuities and/or deviations from the true vertical line causing local, undesirable stress concentrations. In general, these and other defects can result in insufficient load transfer reducing the bearing capacity of the final structure and/or causing excessive settling during service.

To develop the required end bearing capacity, the drilled shaft should be inspected so that undesirable debris may be removed prior to concrete placement. Shaft failures have been attributed to insufficient borehole cleaning, and cleaning the base of boreholes often require special tools. Although the operation sounds simple, a typical cleaning process involves several steps including visually inspecting the borehole, sounding the base of the shaft by a weight attached to a chain, and obtaining samples of the side walls and the base. Based on the results of the visual, sounding, and sampling inspections, a trained inspector determines whether the borehole must be cleaned or otherwise altered before concrete placement. The inspector usually bases his or her decision on the condition of the borehole and the amount of sedimentary deposits at the base. If the inspector determines that cleaning is warranted, several methods may be used, including air lifting, using a clean-out-bucket, or removing debris and unwanted material with a submerged pump.

SUMMARY

In one aspect, the disclosure is directed to an ultrasonic penetrometer. The ultrasonic penetrometer may include an enclosure, an ultrasonic sensor, and a rod. The enclosure may include a channel having a first end and a second end. The ultrasonic sensor may be provided at the first end of the channel and may be configured to generate an ultrasound signal through the second end of the channel. An output from the ultrasound sensor may be used to determine a thickness or stiffness of sediment. The rod may have a proximal end facing the ultrasonic sensor and a distal end opposite the proximal end. The rod may be configured to move relative to the enclosure. The distal end may be configured to contact the sediment. The enclosure may be configured to be fluid-tight relative to an exterior of the enclosure such that the generated ultrasound signal travels in a single medium.

The channel may be tapered outward from the first end to the second end such that the second end may be wider than the first end. An angle of the taper of the channel may be configured to avoid interference with the generated ultrasound signal.

A spring may be coupled to the rod and configured to expand and contract with a movement of the rod relative to the enclosure. A measurement scale may be configured to indicate a position of the proximal end of the rod.

A reflector may be provided on the proximal end of the rod. The ultrasonic sensor may be configured to measure a distance to the reflector.

At least one seal may be configured to seal the channel. The seal may be an O-ring surrounding the channel and/or the rod.

A sensor block may be provided at the bottom end of the channel. The rod may be provided within the sensor block. The single medium may be air.

A boroscope may comprise the ultrasonic penetrometer. The boroscope may comprise the ultrasonic penetrometer, a measurement scale, and an imaging assembly. The imaging assembly may be configured to capture an image of the proximal end of the rod relative to the measurement scale.

In another aspect, the disclosure is directed to a boroscope. The boroscope may comprise a housing, an imaging assembly provided in the housing and configured to visualize a field of view exterior to the housing, and an ultrasonic penetrometer provided in the housing. The ultrasonic penetrometer may include an enclosure, an ultrasonic sensor, and a rod. The enclosure may include a channel having a first end and a second end. The ultrasonic sensor may be provided at the first end of the channel and be configured to generate an ultrasound signal through the second end of the channel. An output from the ultrasound sensor may be used to determine a thickness or stiffness of sediment in a borehole. The rod may have a proximal end facing the ultrasonic sensor and a distal end opposite the proximal end. The rod may be configured to move relative to the enclosure and the housing. The distal end may be configured to contact the sediment. The channel may be sealed.

A pressurized tubing may be configured to form a seal between a surface of the boroscope and an interior of the housing. The pressurized tubing may be filled with liquid antifreeze.

A plurality of steps may be coupled to the housing and within the field of view. The plurality of steps may be arranged to partially overlap in a direction parallel to a direction in which the rod moves. The plurality of steps may have a constant thickness. Each of the plurality of steps include visual markings within the field of view. The visual marking for a given step may indicate a distance from the given step to a surface or end of the housing.

In yet another aspect, the disclosure is directed to a boroscope. The boroscope may include a housing extending between a first end and a second end, an imaging assembly provided in the housing and configured to visualize a field of view exterior to the housing through the second end, a surface provided at the second end, and a plurality of steps provided between the surface and the first end and within the field of view. A given step may be configured to visually indicate a distance from the given step to the surface.

DETAILED DESCRIPTION

Embodiments of the disclosure provide, among other things, a system for accurately inspecting and profiling relatively large construction boreholes such as those prepared for building and various infrastructure drilled shaft foundations. The disclosure may help provide an accurate visual inspection of boreholes to construct deep foundations or slurry walls. Embodiments of the disclosure may determine the strength and thickness of the materials at the bottom of a borehole, the quality of rock surrounding a borehole, as well as the physical and electrical properties, such as, the pressure and the temperature of the slurry in the borehole. This may be accomplished by a portable system utilizing at least one camera and ultrasonic sensors in a watertight assembly. The system of the present disclosure provides a device for full drilled shaft inspection that a single user can operate.

In one embodiment, an inspection system of the disclosure collects data in analog and/or digital form and is capable of providing digital information to a computing device using a cable. In yet another embodiment, the camera and ultrasonic sensors are controlled wirelessly from a computing device. Thus, it is economical and convenient in terms of the number of required personnel and efficient in storing and retrieving the needed information.

The present disclosure may be particularly well-suited for inspection in waterways projects and may provide clear vision in environments where visibility is limited. Moreover, the features of the present disclosure described herein may be less laborious and easier to implement than currently available techniques, as well as being economically feasible and commercially practical.

FIGS. 1 and 2A-2C depict a borescope and overall system, and are described in further detail at the end of the specification.

Figure 3:
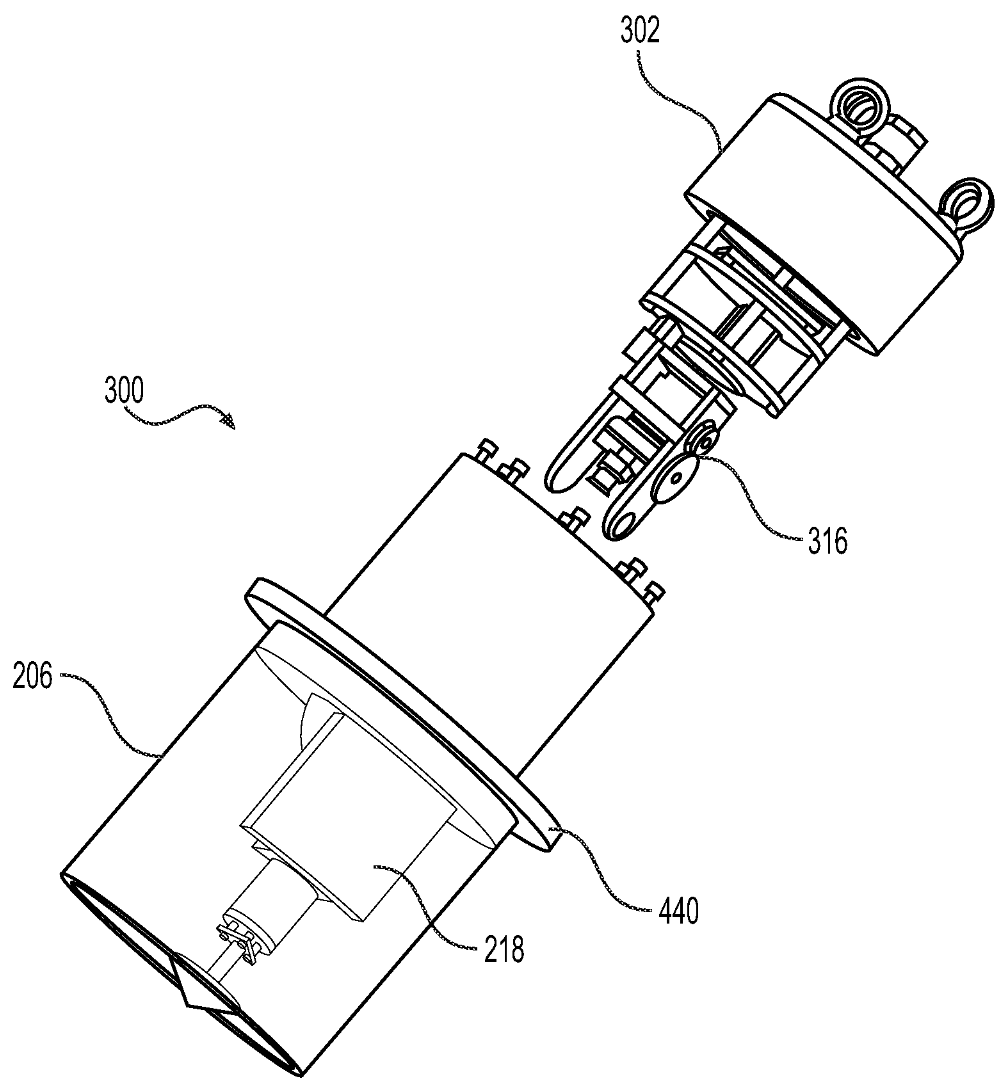
FIG. 3 is an exploded view of an ultrasonic penetrometer assembly and camera assembly.

FIG. 3 depicts an exploded side view of a measurement assembly 100. In particular, FIG. 3 depicts an ultrasonic penetrometer 218 viewable from the exterior of the borescope through observation chamber 206.

FIGS. 4A-4F show ultrasonic penetrometer 218 including an ultrasonic sensor 438, a measurement scale 404, an enclosure 414, and a cone shaped protrusion (tapered block) 402. Protrusion 402 may be tapered radially inward when extending in a direction toward the bottom of the borehole (and otherwise away from assembly 600). Ultrasonic sensor 438 is mounted to a front plate 440 (shown in FIG. 3) of a borescope 100. Ultrasonic sensor 438 can be used for in-air and non-contact object detection that detect objects within a defined area.

The ultrasonic penetrometer 218 measures the stiffness and sediment thickness of the bottom surface of the borehole using, for example, a cone shaped protrusion 402, a sensor block 406 coupled to a spring (biasing member) 418 on a sensor rod 412, and a measurement scale 404. The ultrasonic penetrometer 218 measures the exact displacement or absolute position of moving sensor rod 412 connected to spring 418, which is a representation of the strength of materials at the bottom of the borehole. The spring 418 may be fixedly attached/coupled at a first end to a surface 419 of sensor block 406 facing the bottom of the borehole. Surface 419 may be a fixed and/or non-moving surface (relative to the remainder of enclosure 414). Spring 418 may be coiled around sensor rod 412 and may be fixed/coupled at a second end to a rod shoulder 409. Rod shoulder 409 may be a circumferential protrusion that extends around a portion of rod 412, and may be fixed relative to rod 412. Spring 418 may be coupled and/or fixed to a proximal-facing surface of shoulder 409.

Figure 4A:
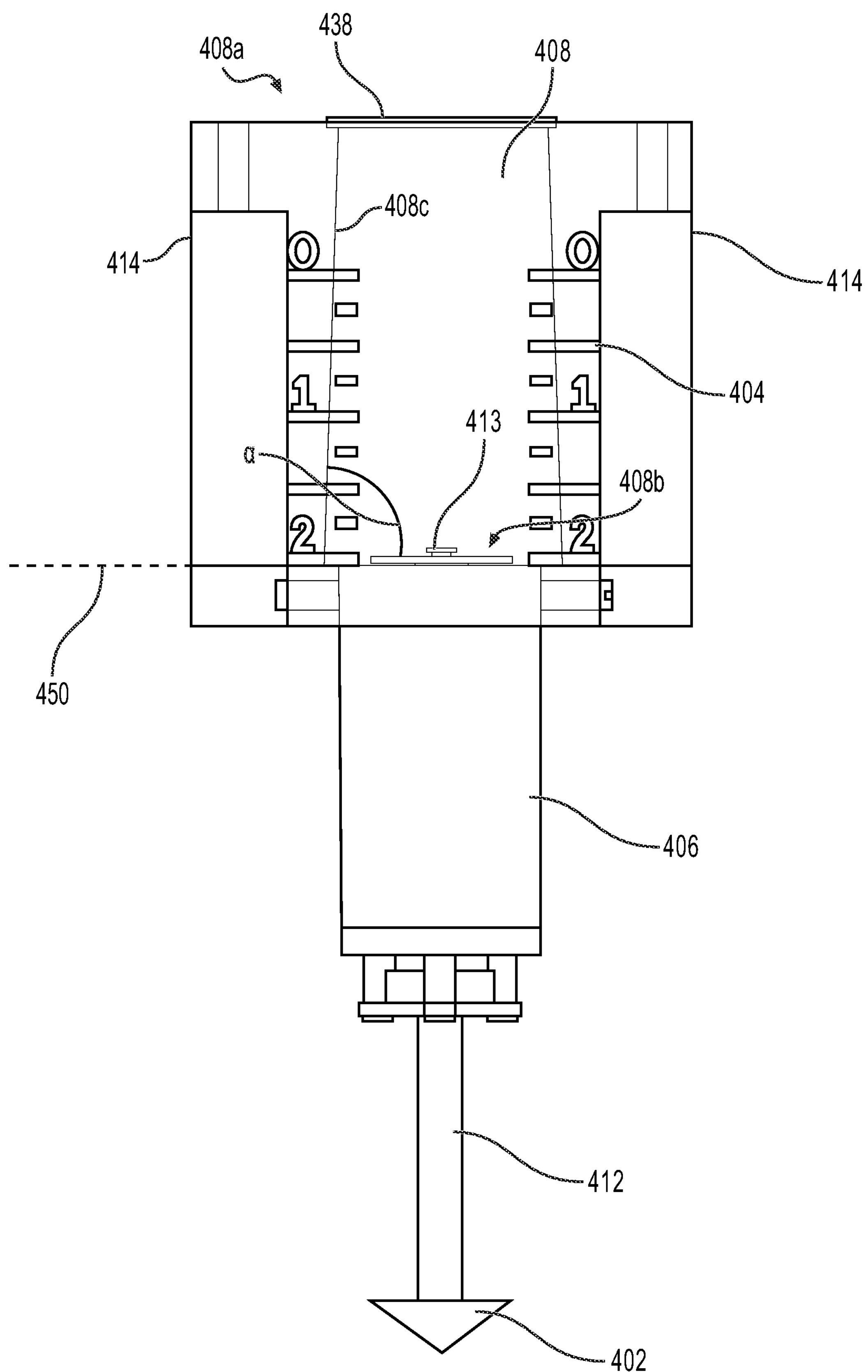
FIG. 4A is a front view of the ultrasonic penetrometer assembly of FIG. 3.
Figure 4B:
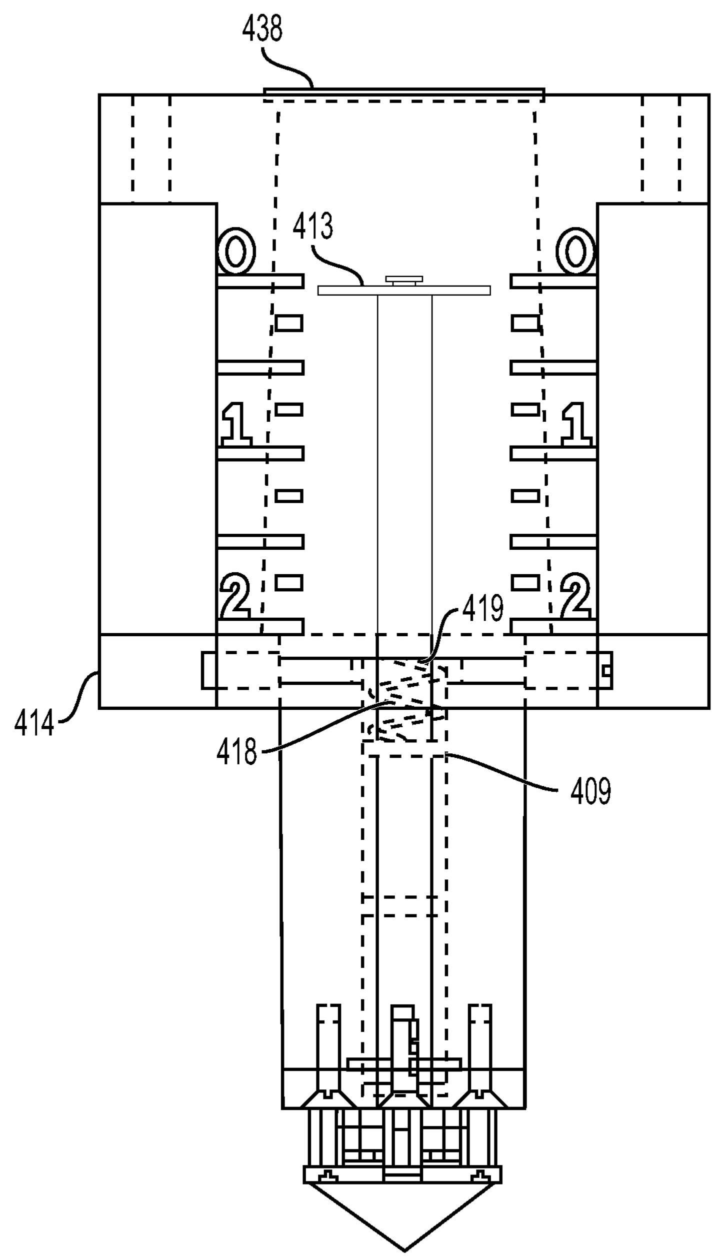
FIG. 4B is a front view of the ultrasonic penetrometer assembly of FIG. 4A in a retracted position.
Figure 4C:
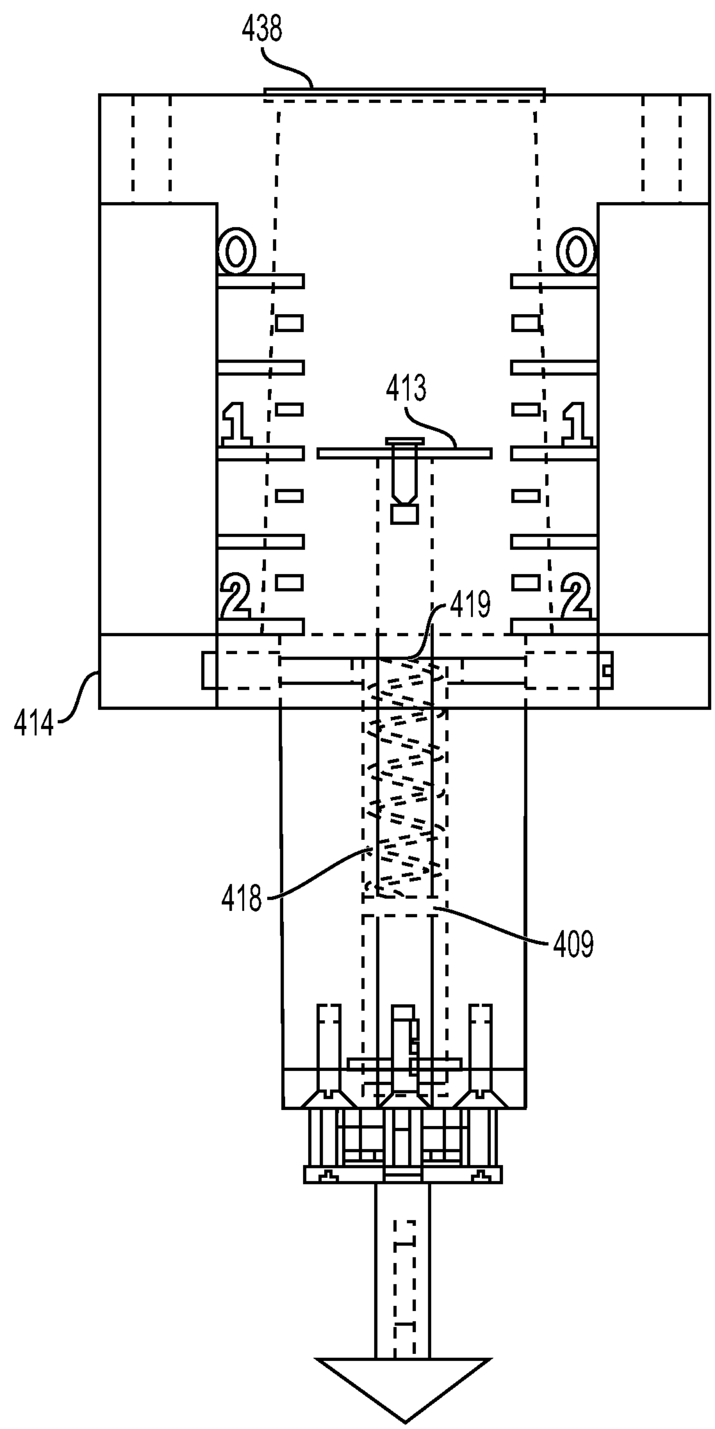
FIG. 4C is a front view of the ultrasonic penetrometer assembly of FIG. 4A in a partially extended position.
Figure 4D:
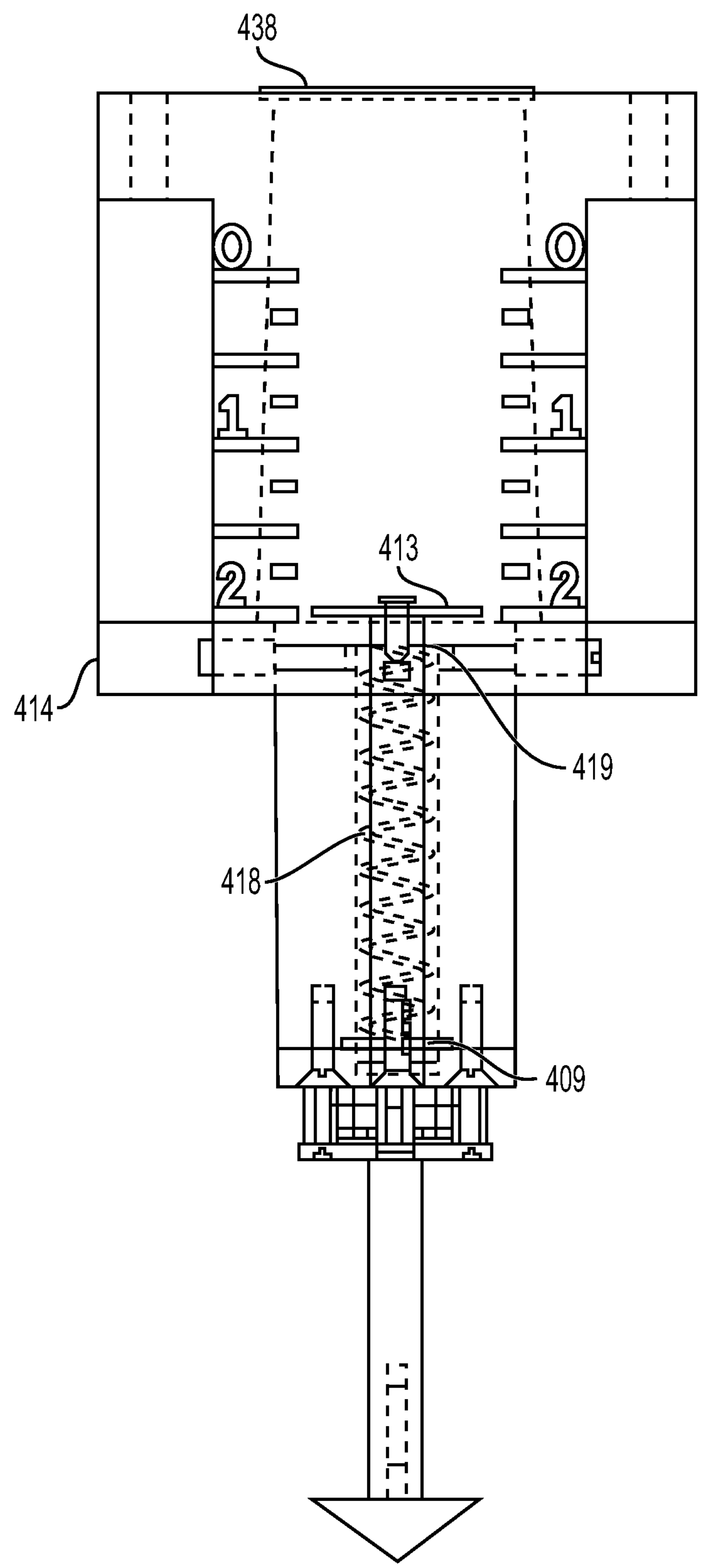
FIG. 4D is a front view of the ultrasonic penetrometer assembly of FIG. 4A in a fully extended position.

The ultrasonic sensor 438 may generate an analog signal proportional to the distance from ultrasonic sensor or transducer 438 to the sensor rod 412. Ultrasonic sensor 438 uses high frequency waves to detect and localize sensor rod 412, and measure the time of flight for a wave that has been transmitted to and reflected back from proximal end 413 of sensor rod 412. Proximal end 413 thus may be a reflector configured to reflect ultrasound waves back toward ultrasonic sensor 438. The time of flight is the time necessary for the ultrasonic wave to travel to the proximal end 413 of sensor rod 412 from ultrasonic sensor 438, and then back to ultrasonic sensor 438. The measured time of flight may be shorter or longer as the distance from sensor 438 to the sensor rod 412 changes according to the compression of spring 418 (FIGS. 4B-4D.) For example, when spring 418 is fully compressed (e.g., by a completely rigid borehole bottom), the ultrasound wave emitted from ultrasonic sensor 438 may have a relatively short time of flight, as compared to when the borehole bottom is soft, and spring 418 is fully extended. In the fully compressed position, proximal end 413 may be disposed closer to ultrasonic sensor 438 than when in the fully extended position. Spring 418 may be materially biased toward the fully extended position.

Enclosure 414 may be mounted or otherwise coupled to front plate 440. Referring to FIG. 4A, enclosure 414 may include a channel 408 extending from a first, top end 408*a* to a second, bottom end 408*b*. Top end 408*a* and bottom end 408*b* may include openings. Channel 408 may be tapered radially outward when extending in a direction from top end 408*a* toward bottom end 408*b*. Thus, channel 408 may be widest (or otherwise have its greatest dimension) at bottom end 408*b*, and may be narrowest (or have its smallest dimension) at top end 408*a*. Ultrasonic sensor 438 may be positioned at top end 408*a* and may encompass an entirety or substantial entirety of the opening at top end 408*a*. An O-ring seal 460 (FIGS. 4E and 4F) may be provided at the top end 408*a* and around ultrasonic sensor 438 to seal the channel. An angle α formed by an intersection of 1) plane 450 encompassing the opening at bottom end 408*b* and the side wall 408*c* of channel 408 may be about 87 degrees, or from about 86.5 degrees to 87.5 degrees, or from about 86 degrees to about 88 degrees. Alternatively, the taper α may have an angle suitable for preventing the signal emitted by the ultrasound sensor 438 from hitting the side walls of the enclosure 414. Channel 408 can be used to direct the signal emitted from ultrasonic sensor 438 towards reflector 413. A taper angle β formed by an intersection of side wall 408*c* and a longitudinal axis 408*d* (FIG. 4E) may be about 3 degrees, or from about 2.5 to about 3.5 degrees, or from about 2 degrees to about 4 degrees. Longitudinal axis 408*d* may be substantially parallel to a central longitudinal axis extending through channel 408.

Enclosure 414 may also be fluid-tight relative to the exterior of enclosure 414. Enclosure 414 being fluid-tight may allow for ultrasonic sensor 438 to emit the signal solely within (only or exactly) one medium and may prevent a second medium from skewing the signal emitted from ultrasonic sensor 438. In an exemplary embodiment, the medium within enclosure 414 may be air or another known gas or gaseous mixture. In another embodiment, the medium within enclosure may be a liquid, such as water or another suitable liquid.

Figure 4E:
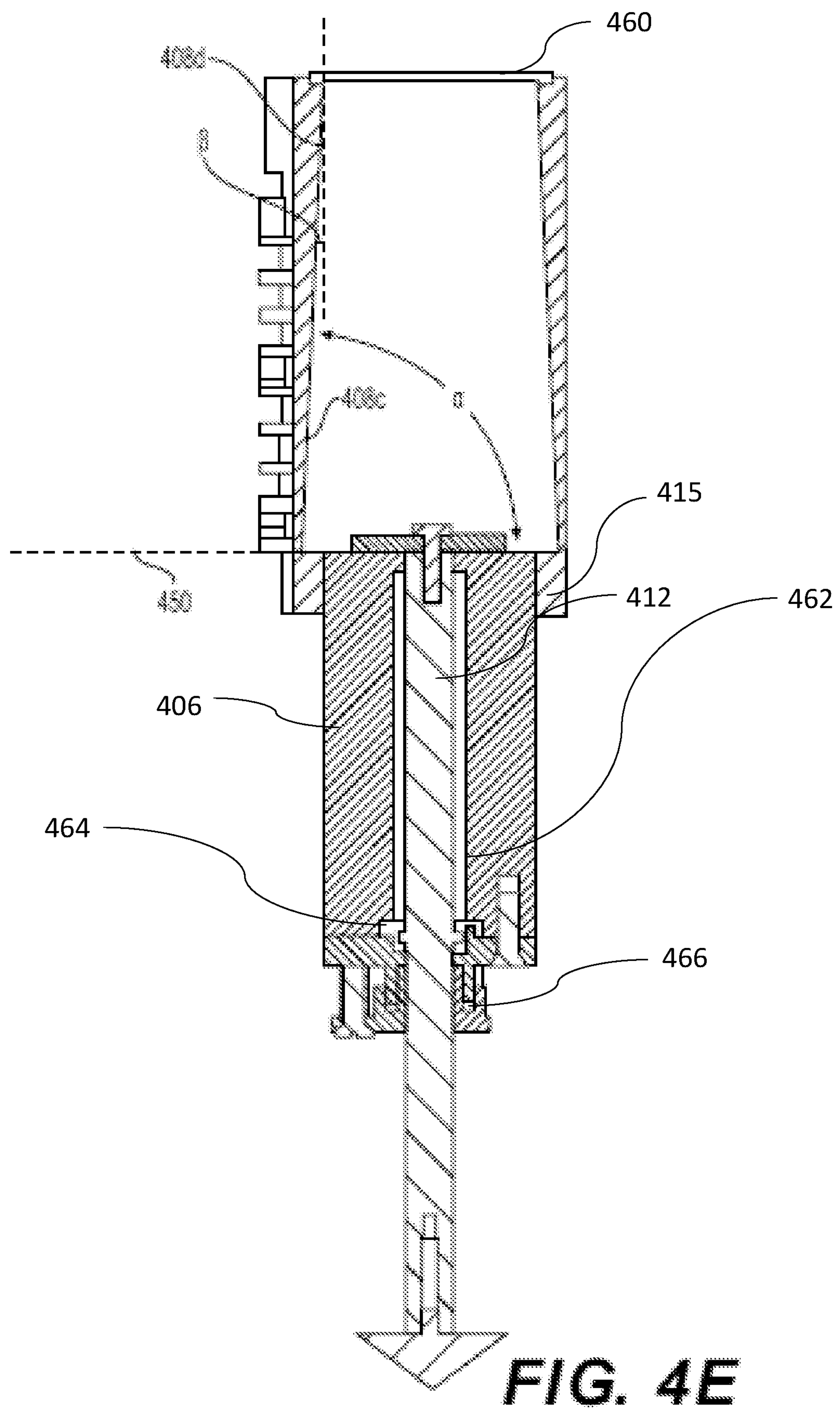
FIG. 4E is a cross-sectional view of the ultrasonic penetrometer assembly of FIG. 3.
Figure 4F:
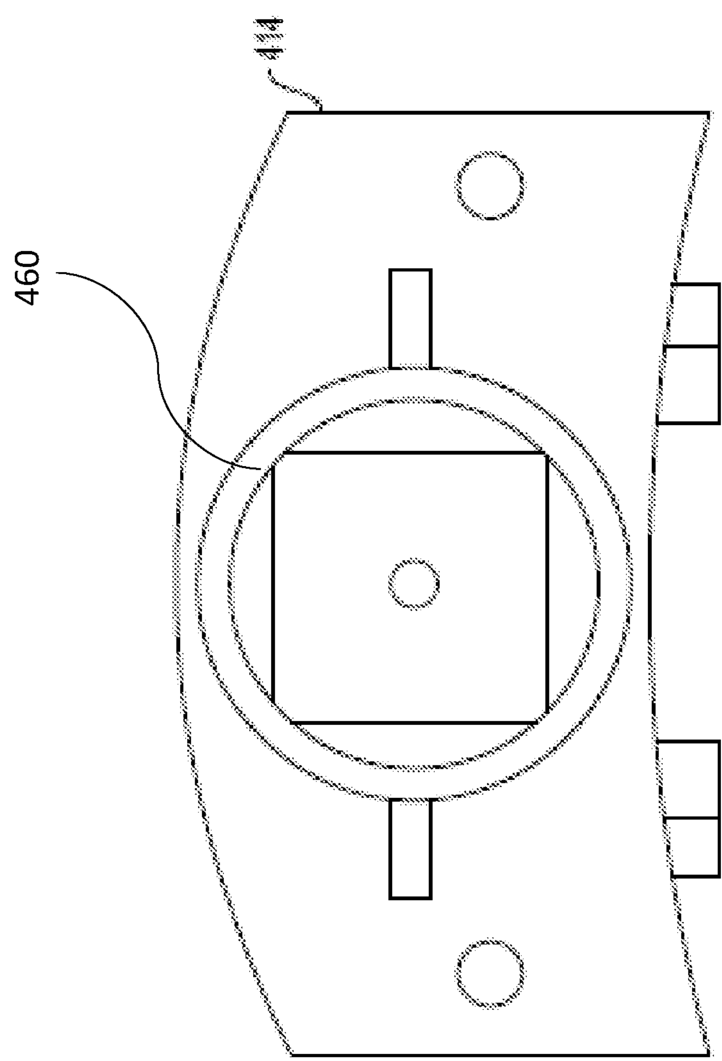
FIG. 4F is a top-down view of the ultrasonic penetrometer assembly of FIG. 3.

For example, enclosure 414, moving sensor rod 412, and/or sensor block 406 may include one or more seals. As shown in FIGS. 4E and 4F and as previously described, enclosure 414 may include an O-ring seal 460 at the top end 308*a* of the channel to seal the channel. In addition, a bottom portion 415 of the enclosure 414 may be shaped and/or configured to surround the sensor block 406 and prevent or reduce fluid (e.g., liquid such as water) from entering the chamber. The bottom portion 415 of the enclosure 414 may have a channel for the sensor block 406 that is narrower than the bottom end 408*b* of a tapered portion of the enclosure 414. Although not shown, a seal may be provided at the bottom end 408*b* and/or between the bottom portion 415 of the enclosure 414 and the sensor block 406.

In addition, one or more O-rings or seals 462, 464, 466 may be provided between the moving sensor rod 412 and the sensor block 406 to further reduce or prevent fluid (e.g., liquid such as water) from entering the chamber of the enclosure 412. For example, a sealing sleeve 462 may surround the moving sensor rod 412 between an outer surface of the moving sensor rod 412 and an inner surface of the sensor block 406. Alternatively or in addition thereto, one or more O-rings 464, 466 may be embedded in an inner surface of the sensor block 406 that surround the moving sensor rod 412 at various axial positions so that a movement or retraction of the sensor rod 412 is less likely to allow fluid such as liquid into the chamber of the enclosure 414. As an alternative to a sealing sleeve implementation, an inner wall 462 of the sensor block 406 may be sized and/or configured to correspond to a size and/or shape of the sensor rod 412 to reduce or prevent fluid into the chamber of the enclosure 414.

The seals 460, 462, 464, and 466 may include a rubber material or other elastomeric material. The seals 460, 462, 464, and/or 466 may be configured as rubber O-ring seals or gaskets.

In the above illustrated embodiment, the time-of-flight measurements help determine sediment thickness of the soil at the bottom of the borehole. The compression of a spring 418 reflects the hardness of the soil at the bottom surface of the borehole experienced by sensor block 402. For example, the harder the soil at the bottom surface of the borehole, the more compression that is observed by spring 418. However, if the soil at the bottom surface of the borehole is relatively soft, less compression is observed by spring 418. Therefore, the calculated time of flight is relatively low for harder soil compared to softer soil. The measurements obtained are accurate because the movement of the proximal end 413 of sensor rod 412 corresponds exactly to the penetration of 402 into the bottom of the borehole.

Ultrasonic sensor 438 has better accuracy to make measurements independent of material, color, transparency, and texture than other tools used for direct measurements, such as, e.g., infrared sensors for a metal obstacle. Other methods of direct measurements have their own associated problems. For example, an LVDT linear position sensor may be immune to magnetic fields, and its output may vary depending on vibration, altitude, and temperature. A very precise, accurate, and stable voltage source is required in such a system, which makes a system using LVDT very costly.

Additionally, measurement scale 404 displays the proportional positions of the compressed spring 418 and sensor rod 412 from their original positions. The position markings on measurement scale 404 may be captured by the camera assembly 216. The obtained position measurements may be used to visually confirm the measurements obtained by ultrasonic sensor 438.

Figure 5A:
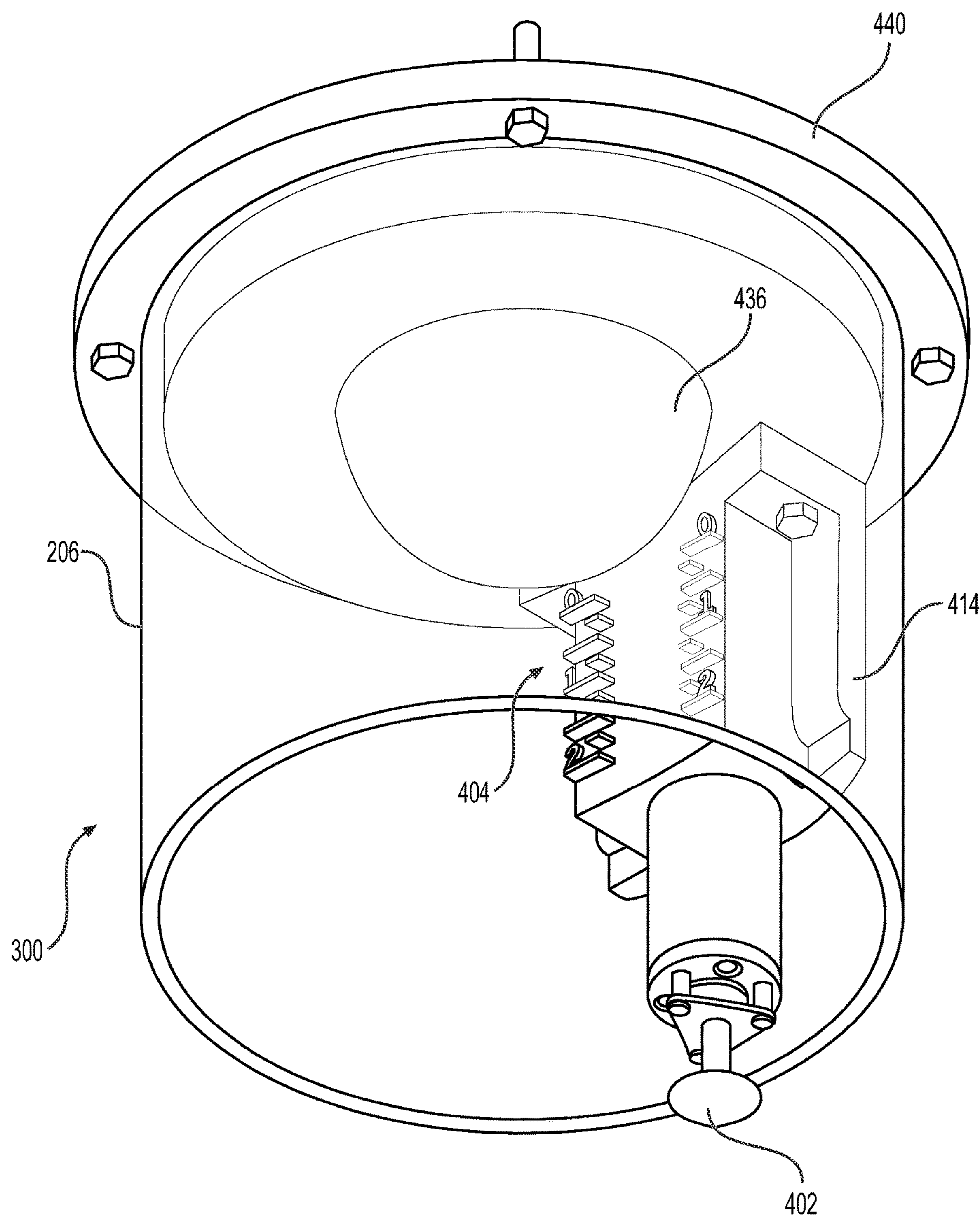
FIG. 5A is an angled bottom view of the ultrasonic penetrometer assembly of FIG. 3.
Figure 5B:
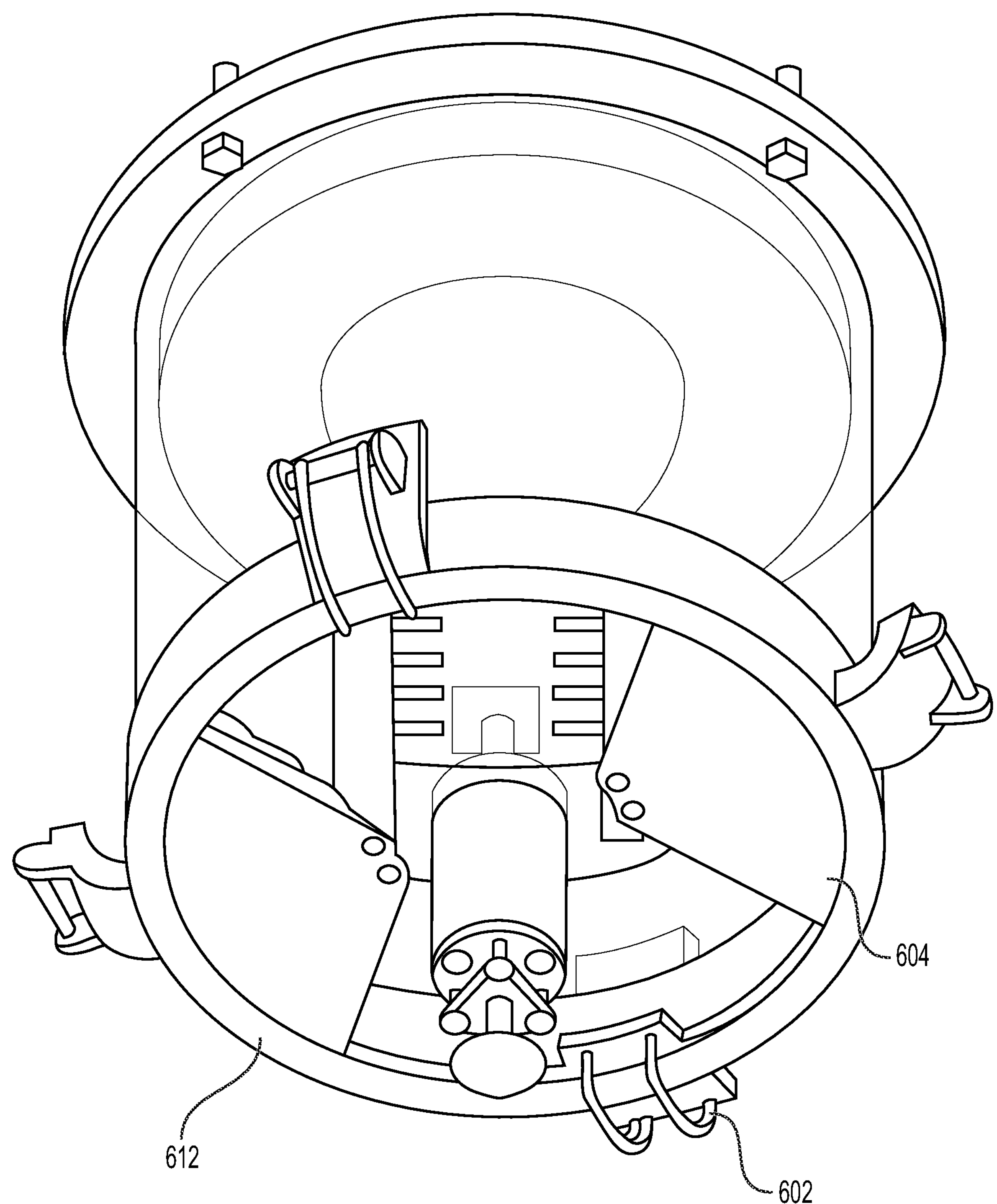
FIG. 5B is an angled bottom view of the ultrasonic penetrometer assembly of FIG. 5A with a tubing and a rim cover.
Figure 5C:
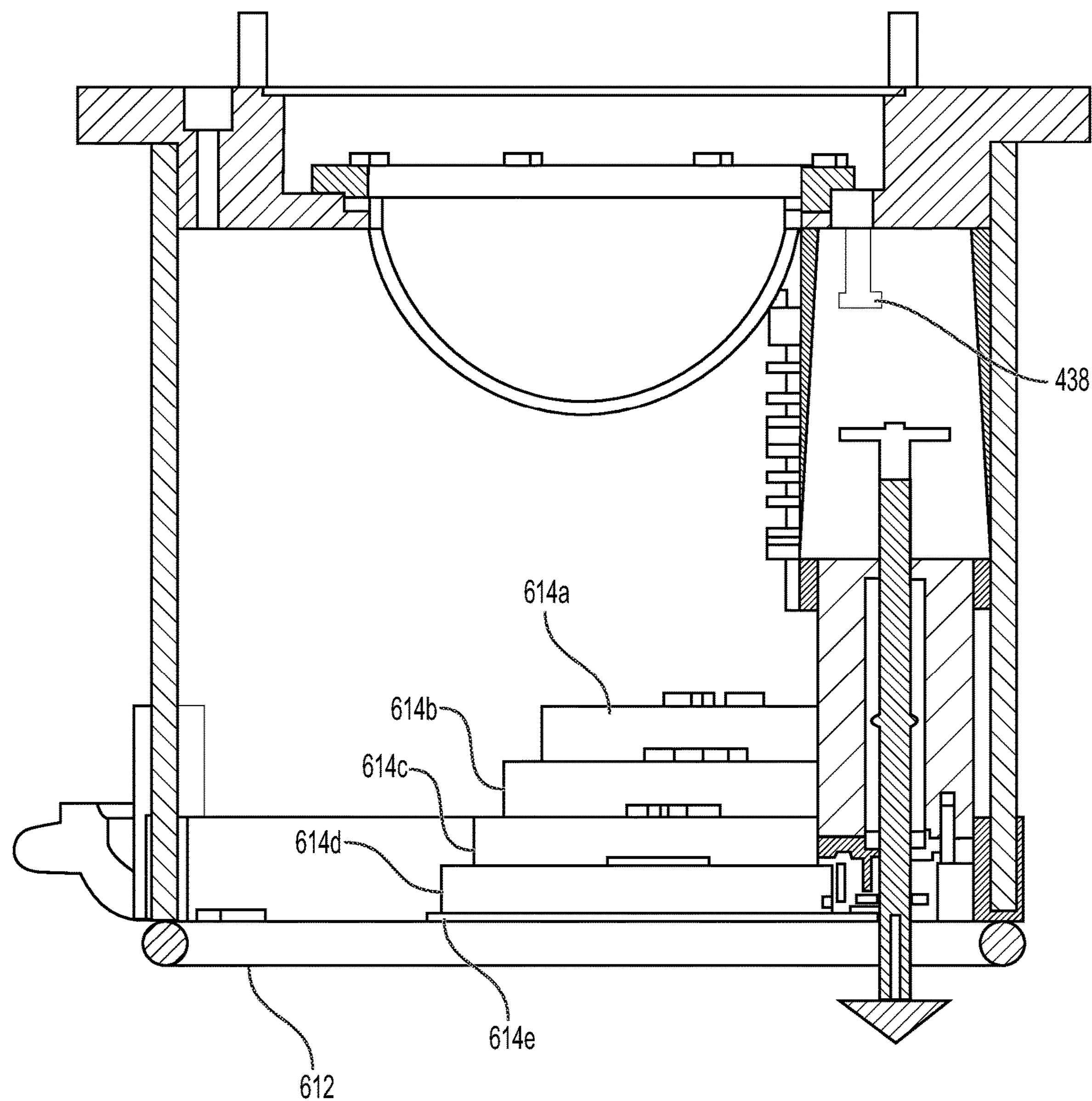
FIG. 5C is a cross-sectional view of the ultrasonic penetrometer assembly of FIG. 5B with a plurality of steps.
Figure 6B:
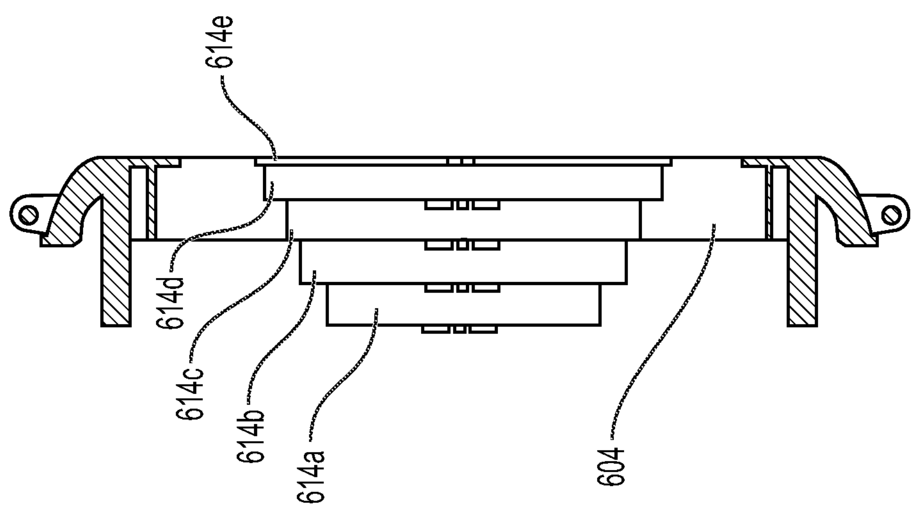
FIG. 6B is cross-sectional view of the rim cover of FIG. 6A.
Figure 6A:
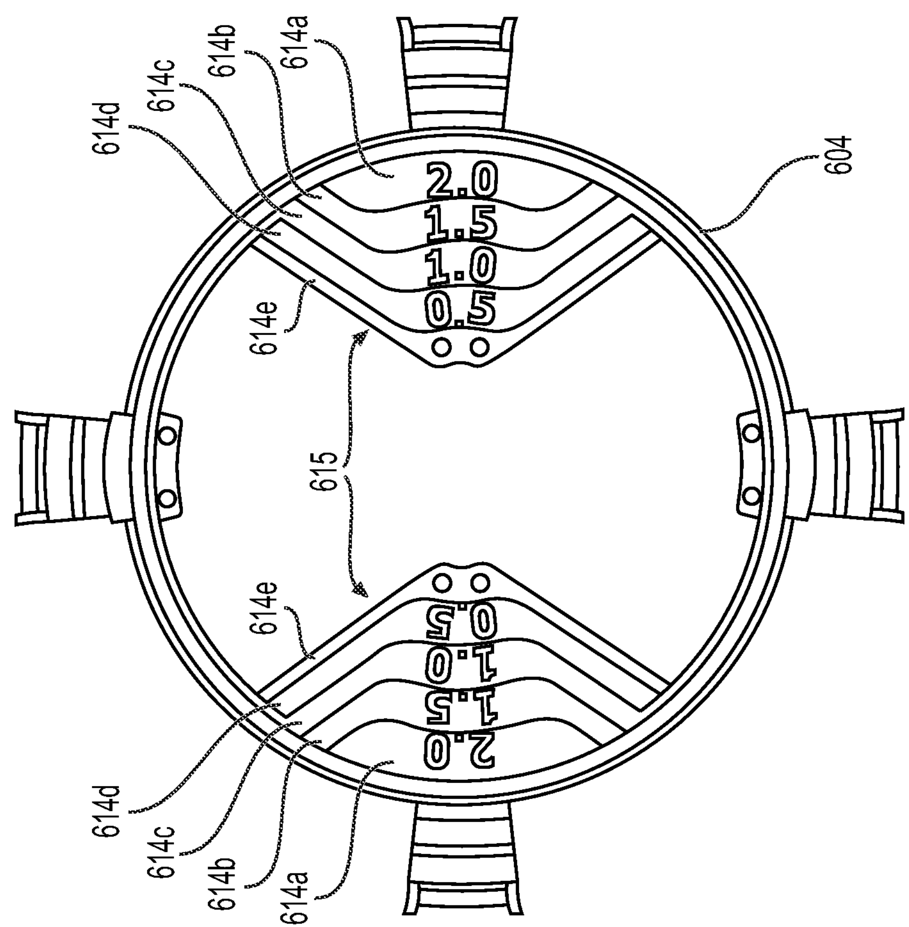
FIG. 6A is a top-down view of a rim cover and a plurality of steps.

FIGS. 5A-5C show viewing assembly 300 including an annular and pressurized tubing 612, observation chamber 206, a securing mechanism 602, a rim cover 604, a plurality of steps 614*a-d*, and transparent dome 436. Rim cover 604 may be mounted to observation chamber 206. Securing mechanism 602 may couple annular tubing 612 to rim cover 604.

Tubing 612 may include any suitable, flexible material, such as rubber. Tubing 612 may be inflated to a suitable degree that enables some degree of compression of tubing 612. Additionally, tubing 612 may be inflated with any gas or liquid suitable for compression when tubing 612 contacts the borehole. In some exemplary embodiments, tubing 612 may be filled with air, nitrogen, or another suitable gas. In other embodiments, tubing 612 may be filled with an anti-freeze liquid mixture, including, e.g., ethylene glycol, propylene glycol, or other additives. The use an antifreeze liquid may help reduce buoyancy (due to the higher density of liquid as compared to gas) while also preventing or minimizing freezing of the liquid filler in cold (sub-freezing) borehole environments. Tubing 612 may be inflated or pressured to a desired inflation or pressure level to achieve proper sealing of a bottom of the borehole. Tubing 612 may be inflated or pressurized only partially, relative to a maximum capacity, in order to allow for tubing 612 to mold to the various uneven surfaces that may be encountered at the bottom of a borehole.

As discussed above, rim cover 604 may include a plurality of steps 614*a-d* that, when mounted to the bottom of observation chamber 206, extend upwardly in a stepwise manner. Each individual step (614*a*, 614*b*, 614*c*, and 614*d*) has a different exposed area than any of the other steps. The plurality of steps 614*a*, 614*b*, 614*c*, and 614*d* may be arranged to partially overlap or be stacked in a direction parallel to a direction in which the rod moves (e.g., upwardly or vertically). Furthermore, the various steps may be configured such that all steps are simultaneously within a field of view of camera 216. Each step 614*a-d* may have a flat surface, which is viewable from camera 216, and which does not overlap and is otherwise not obstructed by any other step. That is, camera 216 may be able to generate an image which includes the flat surfaces (and associated visual markings) of each of steps 614*a*, 614*b*, 614*c*, and 614*d*. Rim cover 604 also may include a bottom surface or flange 614*e*. When rim cover 604 is secured to observation chamber 206, bottom surface 614*e* may be substantially level with/horizontally aligned with the bottom surface of observation chamber 206. The flat surfaces of each step may be spaced apart longitudinally/vertically from an adjacent step. The spacing and/or thickness between adjacent steps may be fixed or variable throughout. For example, each step may be spaced by 0.5 inches from one another, but it should be recognized that any other suitable spacing is contemplated. Furthermore, the bottommost step may be spaced from bottom surface 614*e* by the same fixed interval (e.g., 0.5 inches), or by another suitable interval. As another example, the plurality of steps may have a constant thickness. In this regard, the totality of steps 614 may form a visible scale, since each step may include a visual representation of the distance from bottom surface 614*e* that its respective flat surface is positioned. In the embodiment shown, step 614*d* (closest to bottom surface 614*e*) is spaced 0.5 inches from bottom surface 614*e*, and also includes a visual marking of "0.5" on its flat surface. Similarly, step 614*c* is spaced 1.0 inches from bottom surface 614*e* and includes a visual marking of "1.0". This can be repeated until the desired scope of the scale is achieved. While four steps 614 are shown, any other suitable number is contemplated (e.g., fewer or more steps), with a limiting factor being that the visual markings should be readily ascertainable when imaged by camera 216. Furthermore, in the embodiment shown, there are two sets 615 of steps 614 that are positioned opposite one another on rim cover 604. Steps 614 allow for a visual inspection of sediment thickness through camera 216. For example, penetrometer 218 may contact a rock in the borehole, but soft sediment may fill the observation chamber 206. The penetrometer 218 may give an inaccurate reading because of the rock in the borehole, but the camera 216 may observe the soft sediment within the observation chamber 206 while being able to determine an accurate reading by way of steps 614. The steps 614 provide another manner of measuring the soft sediment. In some examples, visual markings may be omitted and/or a single visual marking indicating a constant step thickness (e.g., 0.5) may be shown, and a distance and/or sediment thickness may be estimated based on a comparison of a number of steps within sediment.

In particular, upon being pressed against the bottom of the filled borehole, tubing 612 creates a seal on the sloped bottom of the borehole and helps enable the system to push out the trapped slurry and mud. According to the disclosure, a fluid source 175 (shown in FIG. 1) may supply pressurized air and/or water (e.g., a gas and a liquid simultaneously) to push out the slurry and mud from the space enclosed by tubing 612 and the bottom of a borehole (or any surface against which tubing 612 is sealed), to provide a clear view of the borehole side surface even though viewing assembly 300 is submerged in the slurry. The trapped slurry and mud may be pushed out through inlet/outlet(s) of the system/borescope. Tubing 612 thus helps define a viewing area for camera 406 in situations where a camera could not otherwise view the walls of the borehole.

Figure 7:
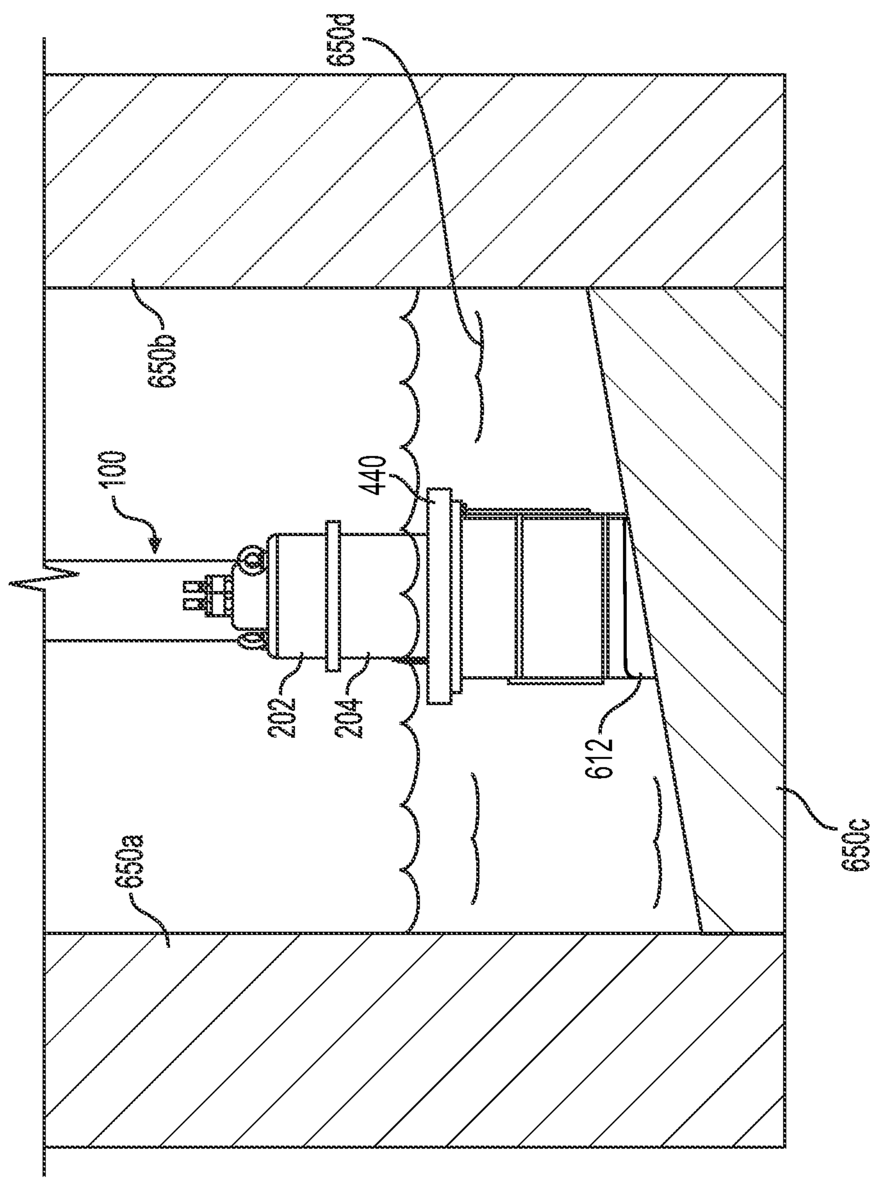
FIG. 7 is an illustration of a measurement assembly deployed in a borehole.

FIG. 7 illustrates an embodiment of measurement assembly 100 deployed in a borehole filled with mud and slurry 650*d*, and having an uneven bottom surface 650*c*. As can be seen, tubing 612 compresses against the uneven bottom surface 650*c*, thereby forming a contour according to the uneven plane of bottom surface 650*c* of the borehole. This contour may stabilize measurement assembly 100 along the uneven bottom surface 650*c* and enable visualization of the bottom surface. The contouring may help provide a better seal against the bottom surface of the borehole for observation chamber 206 when the bottom surface of a borehole is uneven or sloped. Moreover, because tubing 612 compresses in such a manner as to minimize any gaps between the assembly 300 and the surface 650*c*, the seal formed from the contouring may be even more effective.

Overall Borescope System

According to embodiments of the disclosure, measurement assembly 100 generates images and measurements of the interior surfaces of the borehole while suspended in the borehole. In one embodiment, the borescope system provides a line 114 to a computer 118 for displaying and recording the captured images and measurements. In the embodiment shown, measurement assembly 100 communicates with the computer 118 via a power-control cable 120 (also referred to as an umbilical cord). Measurement assembly 100 communicates with computer 118 according to, for example, an RS232 standard, although any other suitable mechanism also is contemplated. It is to be understood that computer 118 may be used in addition to or instead of the display 110 and video recorder 112 for recording the video images of the interior of the borehole and measurements of soil characteristics generated by measurement assembly 100.

The borescope system of the disclosure also includes a case 130 for housing, storing, and transporting various components of the system. The case 130 houses a rechargeable, or otherwise replaceable, battery 134 for supplying power to the various components of the system. In some embodiments, duplicate power and battery systems may be incorporated. An appropriately wired connector panel 136 may provide electrical connections between the various components such as the battery 134, measurement assembly 100, display 110, and/or computer 118.

Figure 1:
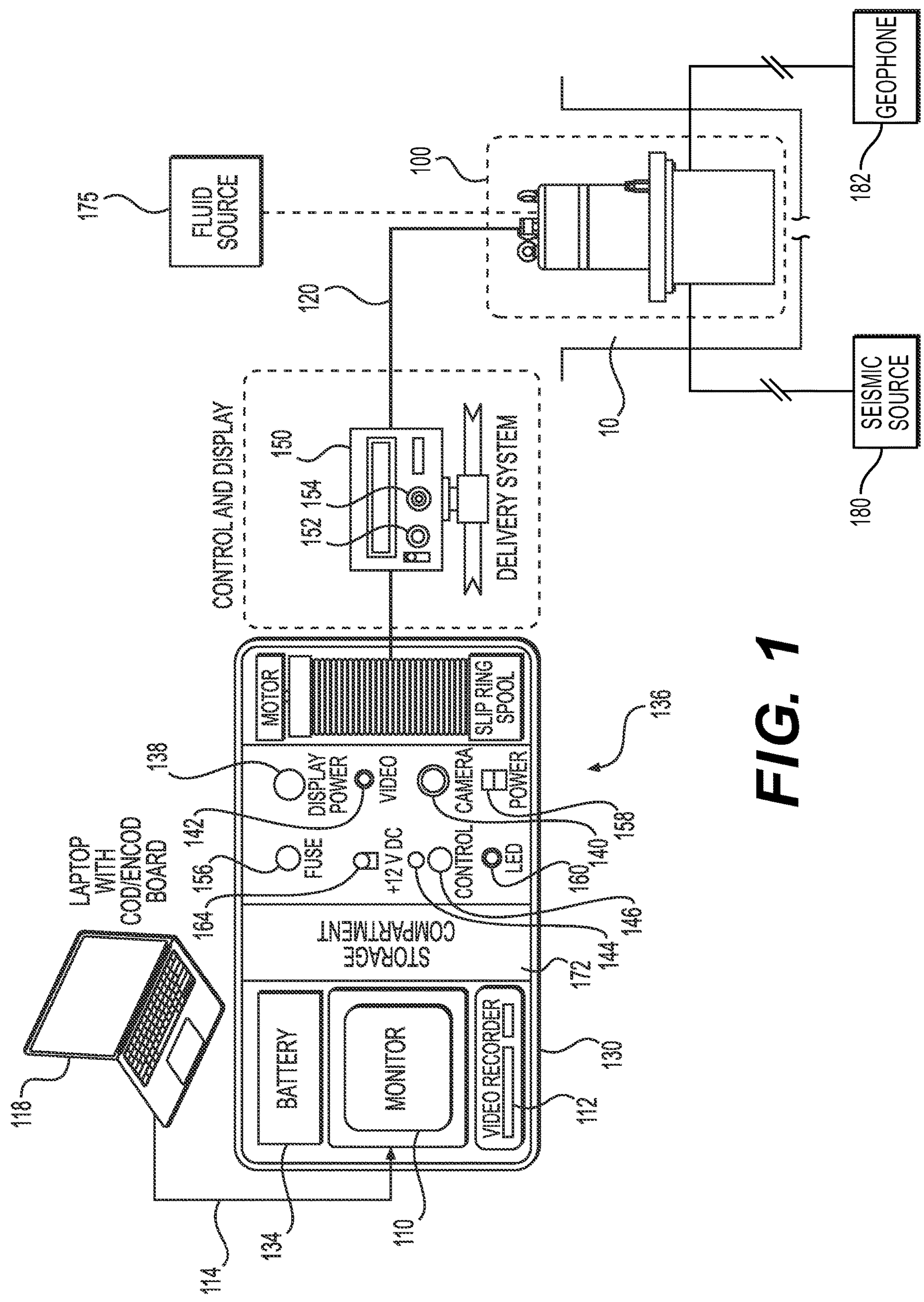
FIG. 1 is a schematic diagram of a borescope system for visually inspecting and profiling drilled shafts according to an embodiment of the disclosure.

Although computer 118 is shown as a laptop computer in FIG. 1, other computer configurations are easily adapted for use with the present disclosure, including, for example, tablets (e.g., construction- or military-grade tablets), smart phones, and the like. Moreover, computer 118 may be self-powered (e.g., independently battery powered), receive power from battery 134, or receive power from an external source independent of the borescope system.

In the illustrated embodiment, battery 134 supplies power to display 110 and recorder 112 via a display power connection 138 and a power line (not shown). Battery 134 also supplies power to measurement assembly 100 via a camera input 140, an ultrasonic sensor input 144 and the power-control cable 120. In the embodiment shown in FIG. 1, the line 114 supplies camera data and sensor measurements to computer 118 (or another external monitor) via a video connector 142. The connector panel 136 also includes a control input 146 described below.

As will be explained in greater detail below, a controller 150 controls measurement assembly 100. The controller 150 is connected on one side, by an umbilical cord containing power-control cable 120 to computer 118. Controller 150 is connected on another side to control input 146 on connector panel 136 via a cable or wireless communication. As shown in FIG. 1, controller 150 further includes a pan controller 152 and a tilt controller 154. Control signals generated by controllers 152, 154 are transmitted to measurement assembly 100 via power-control cable 120. Additionally, the RS232 link between computer 118 and measurement assembly 100 is established via controller 150. Thus, it is possible to generate and transmit computer controlled input information to measurement assembly 100 via controller 150. Likewise, computer 118 can receive information pertaining to at least one camera or ultrasonic sensor from measurement assembly 100 via controller 150.

The connector panel 136 also provides access to a power supply fuse 156, as well as a system power switch 158 and a power indicator 160. Although it is anticipated that the borescope system will often operate using the battery 134, the system also may be connected directly to an external power source using a power line (not shown) connected via a power connector 164. The external power line and power connector 164 also may be used to recharge the battery 134 when the system is not being used. Although the embodiment shown in FIG. 1 contemplates the use of a 12 volt power system, the borescope system of the present disclosure is in no way limited to 12 volt systems. Additionally, the case 130 also includes at least one storage compartment 172 for storing various components of the borescope system when the system is not in use or being transported. A borescope system according to the disclosure may permit control, measurement, and/or display of the depth of ultrasonic penetrometer and camera assembly depth, and/or descending velocity as well as electrical conductivity, pressure, thickness, and/or temperature of the slurry contained in the borehole.

Measuring assembly 100 also may include a seismic source 180 and a geophone (or other suitable sensor) 182. Seismic source 180 may be any device that generates controlled seismic energy used to perform both reflection and refraction seismic surveys. Seismic source 108 may provide single pulses or continuous sweeps of energy, generating seismic waves, which travel through the ground. In one example, seismic source 180 may be a hammer (e.g., a pneumatic hammer), which may strike a metal plate to generate the seismic waves. Some of the seismic waves generated by seismic source 180 may reflect and refract, and may be recorded by geophone 180.

Seismic source 180 and geophone 182 may be used to investigate shallow subsoil structure, for engineering site characterization, or to study deeper structures, or to map subsurface faults. The returning signals from the subsurface structures may be detected by geophone 182 in known locations relative to the position of the subsurface structures.

Figure 2C:
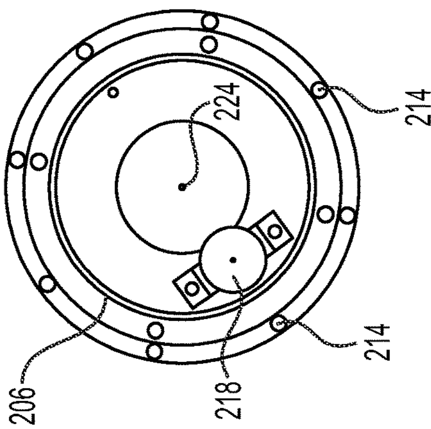
FIG. 2C is an end bottom view of the measurement assembly of FIG. 2A.
Figure 2B:
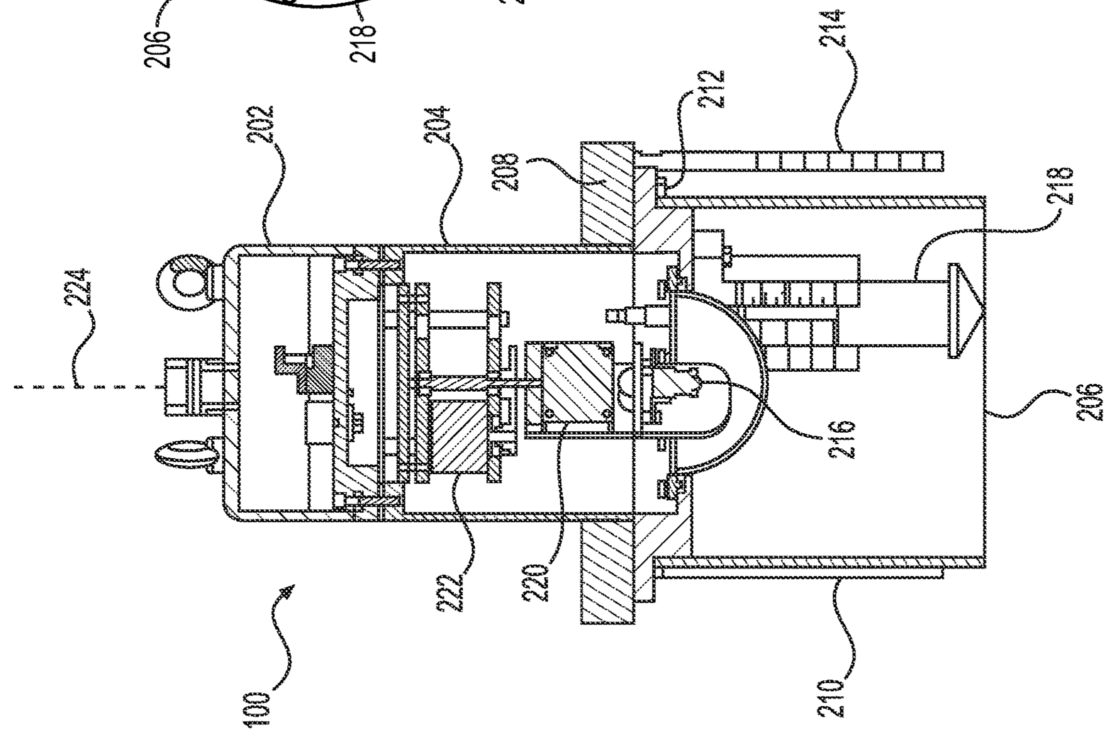
FIG. 2B is a cross-sectional view of the measurement assembly of FIG. 2A, taken along line 2B-2B.
Figure 2A:
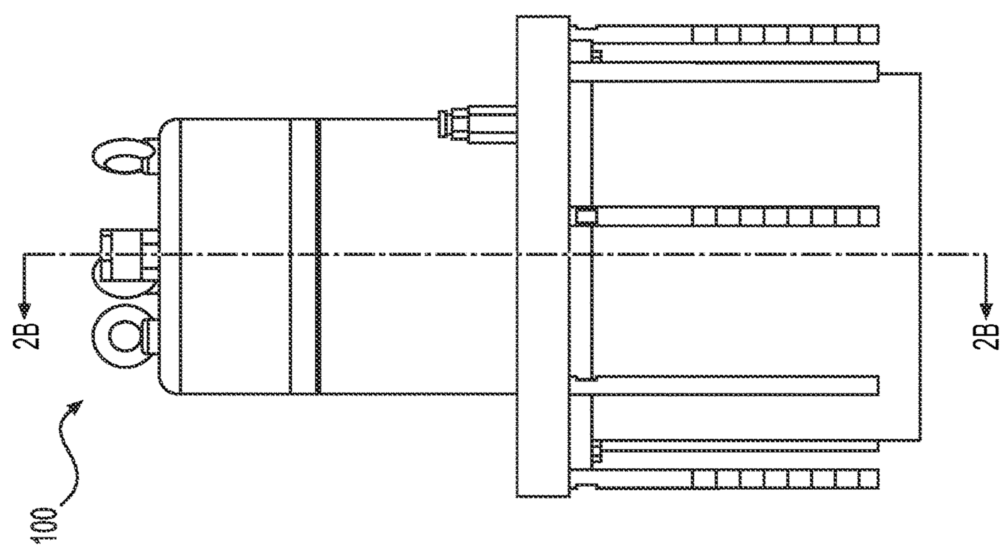
FIG. 2A is a side view of a measurement assembly of the system of FIG.

Referring now to FIGS. 2A and 2B, measurement assembly 100 includes a camera 216 and an ultrasonic penetrometer 218. As described above, the size of the borehole may be much larger than the size of the measurement assembly 100 (e.g., about 28 times or more). In one embodiment, the width of measurement assembly 100, including camera 216, is substantially less than the diameter of the borehole under inspection (e.g., approximately ten inches compared to several feet). The center of the measurement assembly 100 may include a central axis 224. Camera 216 and ultrasonic penetrometer 218 are positioned concentrically about central axis 224.

Camera 216 may be housed within an assembly 204. Assembly 204 is generally cylindrical in this embodiment and constructed using a rigid material such as aluminum. It is to be understood, however, that other materials, such as polyvinyl chloride (PVC), may be suitable for protecting camera 216. Observation chamber 206 provides camera 216 with viewing access to, e.g. a borehole, while protecting camera 216 from damage due to contact with the surfaces being inspected. Any suitable transparent material, including, e.g., glass or transparent plastic could be used to construct observation chamber 206.

Supporting or protective rods 214 are attached to assembly 204 and surround observation chamber 206. Supporting rods 214 protect chamber 206 when the system is lowered into a borehole. Supporting rods 214 may be circumferentially spaced apart from one another about axis 224, and may include graduated markings (indicative of length, e.g., a ruler) along their respective lengths. When measurement assembly 100 is positioned at the bottom of a borehole, measurement assembly 100, including supporting rods 214, may sink into a soft material at the bottom of the borehole. When viewed by a camera 216, the markings of supporting rods 214 may help determine how far measurement assembly 100 has sunk into the bottom of the borehole.

Observation chamber 206 is a generally cylindrical structure constructed of rigid, transparent plastic or a similar material, although other suitable shapes are also contemplated. Observation chamber 206 may have a larger diameter than assembly 204. In an alternative embodiment, observation chamber 206 is made of a flexible, durable, transparent plastic. Observation chamber 206 is particularly well-suited for use in slurry-filled boreholes.

Boreholes are often filled with a viscous mud, or slurry, especially in waterways projects. The slurry, however, obscures the view of the side walls and bottom of the filled borehole. Observation chamber 206 provides camera 216 with a viewing interface. In operation, a system operator lowers camera 216 into observation chamber 206. According to the disclosure, a fluid source 175 may supply pressurized air and/or water (e.g., a gas and a liquid simultaneously) to the observation chamber 206 to push out slurry and mud from the space enclosed by observation chamber 206 to provide clear view of the borehole bottom or side surface even though measurement assembly 100 is submerged in the slurry. Observation chamber 206 thus helps define a viewing area for camera 216 in situations where a camera could not otherwise view the walls or bottom of the borehole. By moving the viewpoint of camera 216 in observation chamber 206, the operator may obtain images and videos of the borehole's interior surface. A light source (LED) may be located on the side of observation chamber 206 e.g., on mounting brackets for camera 216, to illuminate the viewing area while camera 216 is capturing images and videos of the interior surface of the borehole. In some embodiments, observation chamber 206 may have a closed bottom end. In such an embodiment, measuring assembly 100 may be lowered into a borehole while flush with the inner circumferential surface of the borehole, to enable a user to view the inner circumferential surface. The closed bottom end may be achieved via a removable end cover to enable measuring assembly 100 to have multiple operating modes, e.g., one mode with an open bottom end where fluid can move into and out of observation chamber 206, and another mode with a closed bottom end where an exterior of observation chamber 206 forms a fluid tight seal around an interior volume of observation chamber 206.

Measuring assembly 100 also includes ultrasonic penetrometer 218 for sensing physical characteristics of the soil and bore. Ultrasonic penetrometer 218 may be used to measure characteristics of soil such as sediment thickness, calibrated resistance, and slurry density. The present disclosure may be used to determine the structural adequacy of a borehole by capturing clear and accurate images (and videos) of the borehole's bottom and side surfaces. Cleanliness of the bottom and sides of the borehole from any soil or rock residues is an important factor for determining whether the borehole is adequate for constructing deep foundations or slurry walls. Also, evaluating borehole adequacy may include identifying cracking in pipe piles or defects in borehole casing.

FIG. 2C depicts the bottom view of measurement assembly 100 showing ultrasonic penetrometer 218 surrounded by the observation chamber 206 and supporting rods 214. Ultrasonic penetrometer 218 may be displaced adjacent to the periphery of observation chamber 206 accordingly (shown in FIG. 2C), so the penetrometer 218 does not interfere with the movement or view area of camera 216. In such an embodiment, ultrasonic penetrometer 218 may be offset from axis 224 and camera 216.

Referring back to FIG. 2B, a top cover assembly 202 connects to assembly 204 on one side (shown in FIG. 2B) and to the control and display system on the other side via power-control cable 120 (as shown in FIG. 1). Assembly 204, top cover assembly 202, observation chamber 206, and supporting rods 214 are assembled to create a substantially watertight protective housing for the electronics of measurement assembly 100.

As described in detail below, the present system may be used to visually inspect boreholes to construct deep foundations or slurry walls using at least one camera. In addition, the system may be able to determine the strength and characteristics of the materials at the bottom of the boreholes, the volume of the borehole; and the physical and electrical properties, the pressure, and the temperature of the slurry in the borehole.

According to embodiments of the disclosure, measurement assembly 100 generates images and measurements of the interior surfaces of the borehole while suspended in the borehole. In one embodiment, the borescope system provides a line 114 to a computer 118 for displaying and recording the captured images and measurements. In the embodiment shown, measurement assembly 100 communicates with the computer 118 via a power-control cable 120 (also referred to as an umbilical cord). Measurement assembly 100 communicates with computer 118 according to, for example, an RS232 standard, although any other suitable mechanism also is contemplated. It is to be understood that computer 118 may be used in addition to or instead of the display 110 and video recorder 112 for recording the video images of the interior of the borehole and measurements of soil characteristics generated by measurement assembly 100.

The borescope system of the disclosure also includes a case 130 for housing, storing, and transporting various components of the system. The case 130 houses a rechargeable, or otherwise replaceable, battery 134 for supplying power to the various components of the system. In some embodiments, duplicate power and battery systems may be incorporated. An appropriately wired connector panel 136 may provide electrical connections between the various components such as the battery 134, measurement assembly 100, display 110, and/or computer 118.

Although computer 118 is shown as a laptop computer in FIG. 1, other computer configurations are easily adapted for use with the present disclosure, including, for example, tablets (e.g., construction- or military-grade tablets), smart phones, and the like. Moreover, computer 118 may be self-powered (e.g., independently battery powered), receive power from battery 134, or receive power from an external source independent of the borescope system.

In the illustrated embodiment, battery 134 supplies power to display 110 and recorder 112 via a display power connection 138 and a power line (not shown). Battery 134 also supplies power to measurement assembly 100 via a camera input 140, an ultrasonic sensor input 144 and the power-control cable 120. In the embodiment shown in FIG. 1, the line 114 supplies camera data and sensor measurements to computer 118 (or another external monitor) via a video connector 142. The connector panel 136 also includes a control input 146 described below.

As will be explained in greater detail below, a controller 150 controls measurement assembly 100. The controller 150 is connected on one side, by an umbilical cord containing power-control cable 120 to computer 118. Controller 150 is connected on another side to control input 146 on connector panel 136 via a cable or wireless communication. As shown in FIG. 1, controller 150 further includes a pan controller 152 and a tilt controller 154. Control signals generated by controllers 152, 154 are transmitted to measurement assembly 100 via power-control cable 120. Additionally, the RS232 link between computer 118 and measurement assembly 100 is established via controller 150. Thus, it is possible to generate and transmit computer controlled input information to measurement assembly 100 via controller 150. Likewise, computer 118 can receive information pertaining to at least one camera or ultrasonic sensor from measurement assembly 100 via controller 150.

The connector panel 136 also provides access to a power supply fuse 156, as well as a system power switch 158 and a power indicator 160. Although it is anticipated that the borescope system will often operate using the battery 134, the system also may be connected directly to an external power source using a power line (not shown) connected via a power connector 164. The external power line and power connector 164 also may be used to recharge the battery 134 when the system is not being used. Although the embodiment shown in FIG. 1 contemplates the use of a 12 volt power system, the borescope system of the present disclosure is in no way limited to 12 volt systems. Additionally, the case 130 also includes at least one storage compartment 172 for storing various components of the borescope system when the system is not in use or being transported. A borescope system according to the disclosure may permit control, measurement, and/or display of the depth of ultrasonic penetrometer and camera assembly depth, and/or descending velocity as well as electrical conductivity, pressure, thickness, and/or temperature of the slurry contained in the borehole.

Measuring assembly 100 also may include a seismic source 180 and a geophone (or other suitable sensor) 182. Seismic source 180 may be any device that generates controlled seismic energy used to perform both reflection and refraction seismic surveys. Seismic source 108 may provide single pulses or continuous sweeps of energy, generating seismic waves, which travel through the ground. In one example, seismic source 180 may be a hammer (e.g., a pneumatic hammer), which may strike a metal plate to generate the seismic waves. Some of the seismic waves generated by seismic source 180 may reflect and refract, and may be recorded by geophone 180.

Seismic source 180 and geophone 182 may be used to investigate shallow subsoil structure, for engineering site characterization, or to study deeper structures, or to map subsurface faults. The returning signals from the subsurface structures may be detected by geophone 182 in known locations relative to the position of the subsurface structures.

Referring now to FIGS. 2A and 2B, measurement assembly 100 includes a camera 216 and an ultrasonic penetrometer 218. As described above, the size of the borehole may be much larger than the size of the measurement assembly 100 (e.g., about 28 times or more). In one embodiment, the width of measurement assembly 100, including camera 216, is substantially less than the diameter of the borehole under inspection (e.g., approximately ten inches compared to several feet). The center of the measurement assembly 100 may include a central axis 224. Camera 216 and ultrasonic penetrometer 218 are positioned concentrically about central axis 224.

Camera 216 may be housed within an assembly 204. Assembly 204 is generally cylindrical in this embodiment and constructed using a rigid material such as aluminum. It is to be understood, however, that other materials, such as polyvinyl chloride (PVC), may be suitable for protecting camera 216. Observation chamber 206 provides camera 216 with viewing access to, e.g. a borehole, while protecting camera 216 from damage due to contact with the surfaces being inspected. Any suitable transparent material, including, e.g., glass or transparent plastic could be used to construct observation chamber 206.

Supporting or protective rods 214 are attached to assembly 204 and surround observation chamber 206. Supporting rods 214 protect chamber 206 when the system is lowered into a borehole. Supporting rods 214 may be circumferentially spaced apart from one another about axis 224, and may include graduated markings (indicative of length, e.g., a ruler) along their respective lengths. When measurement assembly 100 is positioned at the bottom of a borehole, measurement assembly 100, including supporting rods 214, may sink into a soft material at the bottom of the borehole. When viewed by a camera 216, the markings of supporting rods 214 may help determine how far measurement assembly 100 has sunk into the bottom of the borehole.

Observation chamber 206 is a generally cylindrical structure constructed of rigid, transparent plastic or a similar material, although other suitable shapes are also contemplated. Observation chamber 206 may have a larger diameter than assembly 204. In an alternative embodiment, observation chamber 206 is made of a flexible, durable, transparent plastic. Observation chamber 206 is particularly well-suited for use in slurry-filled boreholes.

Boreholes are often filled with a viscous mud, or slurry, especially in waterways projects. The slurry, however, obscures the view of the side walls and bottom of the filled borehole. Observation chamber 206 provides camera 216 with a viewing interface. In operation, a system operator lowers camera 216 into observation chamber 206. According to the disclosure, a fluid source 175 may supply pressurized air and/or water (e.g., a gas and a liquid simultaneously) to the observation chamber 206 to push out slurry and mud from the space enclosed by observation chamber 206 to provide clear view of the borehole bottom or side surface even though measurement assembly 100 is submerged in the slurry. Observation chamber 206 thus helps define a viewing area for camera 216 in situations where a camera could not otherwise view the walls or bottom of the borehole. By moving the viewpoint of camera 216 in observation chamber 206, the operator may obtain images and videos of the borehole's interior surface. A light source (LED) may be located on the side of observation chamber 206 e.g., on mounting brackets for camera 216, to illuminate the viewing area while camera 216 is capturing images and videos of the interior surface of the borehole. In some embodiments, observation chamber 206 may have a closed bottom end. In such an embodiment, measuring assembly 100 may be lowered into a borehole while flush with the inner circumferential surface of the borehole, to enable a user to view the inner circumferential surface. The closed bottom end may be achieved via a removable end cover to enable measuring assembly 100 to have multiple operating modes, e.g., one mode with an open bottom end where fluid can move into and out of observation chamber 206, and another mode with a closed bottom end where an exterior of observation chamber 206 forms a fluid tight seal around an interior volume of observation chamber 206.

Measuring assembly 100 also includes ultrasonic penetrometer 218 for sensing physical characteristics of the soil and bore. Ultrasonic penetrometer 218 may be used to measure characteristics of soil such as sediment thickness, calibrated resistance, and slurry density. The present disclosure may be used to determine the structural adequacy of a borehole by capturing clear and accurate images (and videos) of the borehole's bottom and side surfaces. Cleanliness of the bottom and sides of the borehole from any soil or rock residues is an important factor for determining whether the borehole is adequate for constructing deep foundations or slurry walls. Also, evaluating borehole adequacy may include identifying cracking in pipe piles or defects in borehole casing.

FIG. 2C depicts the bottom view of measurement assembly 100 showing ultrasonic penetrometer 218 surrounded by the observation chamber 206 and supporting rods 214. Ultrasonic penetrometer 218 may be displaced adjacent to the periphery of observation chamber 206 accordingly (shown in FIG. 2C), so the penetrometer 218 does not interfere with the movement or view area of camera 216. In such an embodiment, ultrasonic penetrometer 218 may be offset from axis 224 and camera 216.

Referring back to FIG. 2B, a top cover assembly 202 connects to assembly 204 on one side (shown in FIG. 2B) and to the control and display system on the other side via power-control cable 120 (as shown in FIG. 1). Assembly 204, top cover assembly 202, observation chamber 206, and supporting rods 214 are assembled to create a substantially watertight protective housing for the electronics of measurement assembly 100.

Embodiments of the present disclosure may facilitate a borehole inspection process, and help avoid the need for deploying human inspectors into the boreholes. Measurements obtained by the present disclosure may help avoid parallax errors resulting from reading a scale at an angle.

The disclosure incorporates U.S. Pat. Nos. 7,187,784, 8,169,477, 10,557,340, and 10,677,039, in their entireties by references.

When introducing elements of the present disclosure or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the disclosure are achieved and other advantageous results attained. As various changes could be made in the above constructions, products, and methods without departing from the scope of the disclosure, it is intended that all matter contained in the above description and shown in the accompanying drawings shall be interpreted as illustrative and not in a limiting sense.

What is claimed is:

1. An ultrasonic penetrometer, comprising:
- an enclosure including a channel having a first end and a second end;
- an ultrasound sensor provided at the first end of the channel and configured to generate an ultrasound signal through the second end of the channel, wherein an output from the ultrasound sensor is used to determine a thickness or stiffness of sediment; and
- a rod having a proximal end facing the ultrasound sensor and a distal end opposite the proximal end, the rod being configured to move relative to the enclosure and the distal end being configured to contact the sediment, wherein the channel of the enclosure is configured to be fluid-tight relative to an exterior of the enclosure such that the generated ultrasound signal travels in a single medium.

2. The ultrasonic penetrometer of claim 1, wherein the channel is tapered outward from the first end to the second end such that the second end is wider than the first end.

3. The ultrasonic penetrometer of claim 2, wherein an angle of a taper of the channel is configured to avoid interference with the generated ultrasound signal.

4. The ultrasonic penetrometer of claim 1, further comprising a spring coupled to the rod and configured to expand and contract with a movement of the rod relative to the enclosure.

5. The ultrasonic penetrometer of claim 1, further comprising a measurement scale configured to indicate a position of the proximal end of the rod.

6. The ultrasonic penetrometer of claim 1, further comprising a reflector provided on the proximal end of the rod, wherein the ultrasound sensor is configured to measure a distance to the reflector.

7. The ultrasonic penetrometer of claim 1, further comprising at least one seal configured to seal the channel.

8. The ultrasonic penetrometer of claim 7, wherein the seal is an O-ring surrounding the channel and/or the rod.

9. The ultrasonic penetrometer of claim 1, further comprising a sensor block provided at the second end of the channel, wherein the rod is provided within the sensor block.

10. The ultrasonic penetrometer of claim 1, wherein the single medium is air.

11. A boroscope comprising the ultrasonic penetrometer of claim 1.

12. A boroscope comprising the ultrasonic penetrometer of claim 5 and an imaging assembly, wherein the imaging assembly is configured to capture an image of the proximal end of the rod relative to the measurement scale.

13. An ultrasonic penetrometer, comprising:
- an enclosure including a channel having a first end and a second end, wherein the channel is tapered outward from the first end to the second end such that the second end is wider than the first end;
- an ultrasound sensor provided at the first end of the channel and configured to generate an ultrasound signal through the second end of the channel, wherein an output from the ultrasound sensor is used to determine a thickness or stiffness of sediment; and
- a rod having a proximal end facing the ultrasound sensor and a distal end opposite the proximal end, the rod being configured to move relative to the enclosure and the distal end being configured to contact the sediment, wherein the enclosure is configured to be fluid-tight relative to an exterior of the enclosure such that the generated ultrasound signal travels in a single medium.

14. The ultrasonic penetrometer of claim 13, wherein an angle of a taper of the channel is configured to avoid interference with the generated ultrasound signal.

15. The ultrasonic penetrometer of claim 13, further comprising a reflector provided on the proximal end of the rod, wherein the ultrasound sensor is configured to measure a distance to the reflector.

16. A boroscope comprising the ultrasonic penetrometer of claim 13.

17. An ultrasonic penetrometer, comprising:
- an enclosure including a channel having a first end and a second end;
- an ultrasound sensor provided at the first end of the channel and configured to generate an ultrasound signal through the second end of the channel, wherein an output from the ultrasound sensor is used to determine a thickness or stiffness of sediment;
- a rod having a proximal end facing the ultrasound sensor and a distal end opposite the proximal end, the rod being configured to move relative to the enclosure and the distal end being configured to contact the sediment, wherein the enclosure is configured to be fluid-tight relative to an exterior of the enclosure such that the generated ultrasound signal travels in a single medium; and
- at least one seal configured to seal the channel, wherein the seal is an O-ring surrounding the channel and/or the rod.

18. The ultrasonic penetrometer of claim 17, wherein the channel is tapered outward from the first end to the second end such that the second end is wider than the first end,
- wherein an angle of a taper of the channel is configured to avoid interference with the generated ultrasound signal.

19. The ultrasonic penetrometer of claim 17, further comprising a spring coupled to the rod and configured to expand and contract with a movement of the rod relative to the enclosure.

20. The ultrasonic penetrometer of claim 17, further comprising a reflector provided on the proximal end of the rod, wherein the ultrasound sensor is configured to measure a distance to the reflector.

* * * * *